United States Patent [19]

Bergmans et al.

[11] Patent Number: 5,570,396
[45] Date of Patent: Oct. 29, 1996

[54] TRANSMISSION SYSTEM COMPRISING RECEIVER WITH IMPROVED TIMING MEANS

[75] Inventors: Johannes W. M. Bergmans; Ho W. Wong-Lam, Eindhoven, both of Netherlands

[73] Assignee: U.S. Philips Corporation, New York, N.Y.

[21] Appl. No.: 240,041

[22] Filed: May 6, 1994

[30] Foreign Application Priority Data

May 7, 1993 [EP] European Pat. Off. .............. 93201326

[51] Int. Cl.$^6$ .............................. H04L 7/00; H04L 27/14; H03D 3/24
[52] U.S. Cl. ........................ 375/355; 375/343; 375/373
[58] Field of Search .............................. 375/58, 59, 75, 375/106, 60, 81, 118, 119, 295, 285, 296, 327, 355, 373, 371, 229, 230, 232, 340, 341, 343; 364/828, 819, 728.03; 328/72, 74, 63, 155; 307/269; 327/141, 335

[56] References Cited

U.S. PATENT DOCUMENTS

| | | | |
|---|---|---|---|
| 3,978,407 | 8/1976 | Forney, Jr. et al. | 375/232 |
| 4,320,517 | 3/1982 | Godard et al. | 375/232 |
| 4,669,092 | 5/1987 | Sari et al. | 375/106 |
| 4,794,341 | 12/1988 | Barton et al. | 375/340 |
| 4,912,729 | 3/1990 | Van Rens et al. | 375/81 |
| 4,959,845 | 9/1990 | Tol et al. | 375/106 |
| 5,276,711 | 1/1994 | Rossi | 375/106 |
| 5,309,482 | 5/1994 | Wright et al. | 375/106 |

OTHER PUBLICATIONS

"Timing Recovery in Digital Synchronous Data Receivers" by K. H. Mueller and M. Muller in IEEE Transactions on Communications, vol. COM–24, No. 5, May 1976.

"Low Complexity Viterbi Detector for Magnetic Disc Drives" by N. H. Gottfried in IEEE Proceedings–E, vol. 140, No. 1, Jan. 1993.

"Carrier and Bit Synchronization in Data Communication–A Tutorial Review" by L. E. Franks in IEEE Transactions on Communications, vol. COM–28, No. 8, Aug. 1980.

Primary Examiner—Tesfaldet Bocure

[57] ABSTRACT

In a digital symbol receiver it is necessary to generate a clock signal with a correct frequency and phase, so that decisions $\hat{a}_k$ about the value of transmitted symbols $a_k$ can be made at the right detection instants. A simple method of obtaining the desired clock signal is to adjust a VCO by means of a control signal obtained from the correlation of a detection signal r(t) with the detected symbols $\hat{a}_k$ filtered by a symbol filter. The symbol filter may comprise a cascade connection of a differentiator and a filter which has a transfer function which is an estimate of the transfer function of a channel which supplies the transmitted symbols.

10 Claims, 3 Drawing Sheets

TRANSMISSION SYSTEM COMPRISING RECEIVER WITH IMPROVED TIMING MEANS

BACKGROUND OF THE INVENTION

This invention relates to a digital transmission system comprising a transmitter coupled to a receiver via a channel, the receiver comprising a detector for determining detected symbols at detection instants from a detection signal derived from the input signal of the receiver, timing means for determining a timing error signal by correlation of a first auxiliary signal derived from the detected symbols with a second auxiliary signal derived from the input signal of the receiver, and for adapting the detection instants in response to the timing error signal.

The invention likewise relates to a receiver for such a transmission system.

A transmission system as defined in the opening paragraph is known from the journal article "Timing Recovery in Digital Synchronous Data Receivers" by K. H. Mueller and M. Müller in IEEE Transactions on Communications, Vol. COM-24, No. 5, May 1976.

Transmission systems of this type may be used, for example, for transferring data signals via a transmission medium, for example, a cable or radio link, or for reconstituting data signals coming from a magnetic tape or disc.

When data symbols are transferred via a transmission medium or data symbols are stored on a recording medium respectively, the symbols to be transmitted or recorded respectively, are converted by coding means into data pulses which are applied to the transmission medium or recording medium further to be referenced by the term channel.

The output signal of the channel is applied to the input of the receiver. A detection signal is derived from the input signal of the receiver. This may be effected, for example, by an adaptive equalizer and/or an adaptive echo canceller. It is likewise conceivable that the detection signal is determined from the input signal of the receiver by a fixed filter.

At suitable detection instants the detector determines a series of detected symbols from the detection signal. The detector may comprise a simple bit-by-bit detector, but it is alternatively conceivable that the detector comprises a so-called Maximum Likelihood Sequence Estimation detector such as, for example, a Viterbi detector.

If the detection instants differ from the optimum detection instants, the contribution to the detection signal by different symbols from the symbol to be detected will generally increase, which will reduce the reliability of the decision made about the value of the detected symbol. This contribution is called intersymbol interference.

In order to avoid this reduction of the reliability of the decision about the correct symbol value, prior-art transmission system comprises timing means for deriving suitable detection instants from the input signal of the receiver.

In the prior-art system a clock signal indicating the optimum detection instants is derived from the input signal of the receiver and the value of the detected symbols.

A first method of determining the detection instants, which method is known from said journal article, is determining a timing error signal by correlating a first auxiliary signal, i.e. the detected symbol value delayed by a symbol interval, with a second auxiliary signal, i.e. the detection signal. The drawback of such a simple method is that a considerable amount of timing information present in the input signal of the receiver is not utilized. As a result, the detection instants show a certain jitter which leads to a sub-optimum detection.

To reduce the jitter during the detection instants, said journal article discloses timing means which utilize more first auxiliary signals which are derived each from a number of symbol values detected at different detection instants. Each of these auxiliary signals is correlated by its own correlator with an associated second auxiliary signal derived from the input signal, while a control signal for a controllable oscillator to adapt the detection instants is obtained by adding together the output signals of the correlators.

SUMMARY OF THE INVENTION

If a large number of auxiliary signals are used for improving the performance of the timing means, these timing means become rather complicated.

It is an object of the invention to provide a transmission system as defined in the opening paragraph in which considerably simpler timing means will suffice, without a degradation of the performance of the timing means.

For this purpose, the invention is characterized in that the timing means comprise a symbol filter, which has an impulse response that depends on the impulse response of the channel, thereby to derive the first auxiliary signal.

The invention is based on the recognition that it is possible to utilize substantially all timing information present in the input signal of the receiver by selecting a symbol filter which has an impulse response that depends on the channel impulse response. It is then not necessary to utilize more than a single correlator.

It is observed that in the journal article entitled "Low complexity Viterbi detector for magnetic disc drives" by N. H. Gottfried in IEE Proceedings-E, Vol. 140, No 1, January 1993, timing means are described which utilize only a multiplier. These timing means, however, are specifically intended for a so-called RLL coding method. In addition, there is no filtering of the detected symbols in these timing means.

An embodiment of the invention is characterized in that the impulse response of the symbol filter comprises an approximation of the first derivative with respect to time of the impulse response of the channel from the output of the transmitter to an input of the detector.

It appears that this choice for the impulse response leads to an optimum use of the timing information present in the input signal of the receiver. The basis for the choice of the impulse response of the symbol filter is the recognition that, if white noise occurs, the cross-correlation between the second auxiliary signal and an estimate of that second auxiliary signal is to be a maximum for a minimum timing error signal. This recognition is also evident from the journal article entitled "Carrier and Bit Synchronization in Data Communication—A Tutorial Review" by L. E. Franks in IEEE Transactions on Communications, Vol. COM-28, No. 8, August 1980.

For an estimate of this cross-correlation there may be written:

$$\Lambda(\theta) = \int_{-\infty}^{+\infty} r(t) \cdot x(t-\theta) dt \quad (1)$$

where r(t) is the second auxiliary signal, x(t−θ) is the first auxiliary signal i.e. an estimate of the second auxiliary signal, and θ a delay to be determined by the timing means. There is assumed in this case that the impulse response of the cascade connection of the channel and the auxiliary means is known and that all decisions $â_k$ about the symbols $a_k$ are correct.

The timing error signal is minimum if (1) is maximum. To find this maximum, the derivative Λ'(θ) with respect to θ is to be set equal to 0. (1) then changes into:

$$\Lambda'(\theta) = -\int_{-\infty}^{+\infty} r(t) \cdot x'(t-\theta) dt = 0 \qquad (2)$$

If θ is optimal, (2) is equal to zero, but for values of θ differing from the optimal value, (2) produces a value different from zero and the sign of this value is inverted around the optimal value of θ. This means that (2) is a suitable magnitude for adapting the detection instants to come to optimal detection instants. Because the signal r(t) contains a noise component n(t) in addition to a data-dependent component that can be approximated by x(t–θ), the value of θ will contain some jitter owing to this noise term.

A further embodiment of the invention is characterized in that the auxiliary means comprise a whitening filter for transforming a noise component present in the input signal of the receiver into a substantially white noise component at the output of the auxiliary means and in that the symbol filter has a transfer function equal to the product of the transfer function of the whitening filter and the transfer function associated with an impulse response which is an approximation of the first derivative with respect to time of the channel impulse response.

By connecting the whitening filter and accordingly adapting the impulse response of the symbol filter, the ratio between the timing information present in the output signal and the noise component present in that signal is maximized. By whitening the noise signal prior to the correlation being carried out, the property is used that a white noise signal having a certain power level has a less disturbing effect on the output signal of a correlator compared with non-white noise signals having a similar power level.

A further embodiment of the invention is characterized in that the auxiliary means comprise the input means and in that the auxiliary means comprise a subtracter circuit for deriving the second auxiliary signal from the difference between the detection signal and a detection signal estimate which is derived from the detected symbols.

By deriving the second auxiliary signal from the difference between the detection signal and a detection signal estimate, there is avoided that the decision instants show a jitter which depends on the received symbol values, so that the implementation of this measure leads to further improved performance of the timing means. The second auxiliary signal is now equal to the difference between the detection signal and the expected detection signal. This second auxiliary signal is ideally equal to zero if the timing error signal is equal to zero and if, at the same time, no noise occurs in the output signal of the channel.

BRIEF DESCRIPTION OF THE DRAWING

The invention will now be further explained with reference to the drawing Figures, in which.

DETAILED DESCRIPTION OF THE PREFERRED

Figure 1:
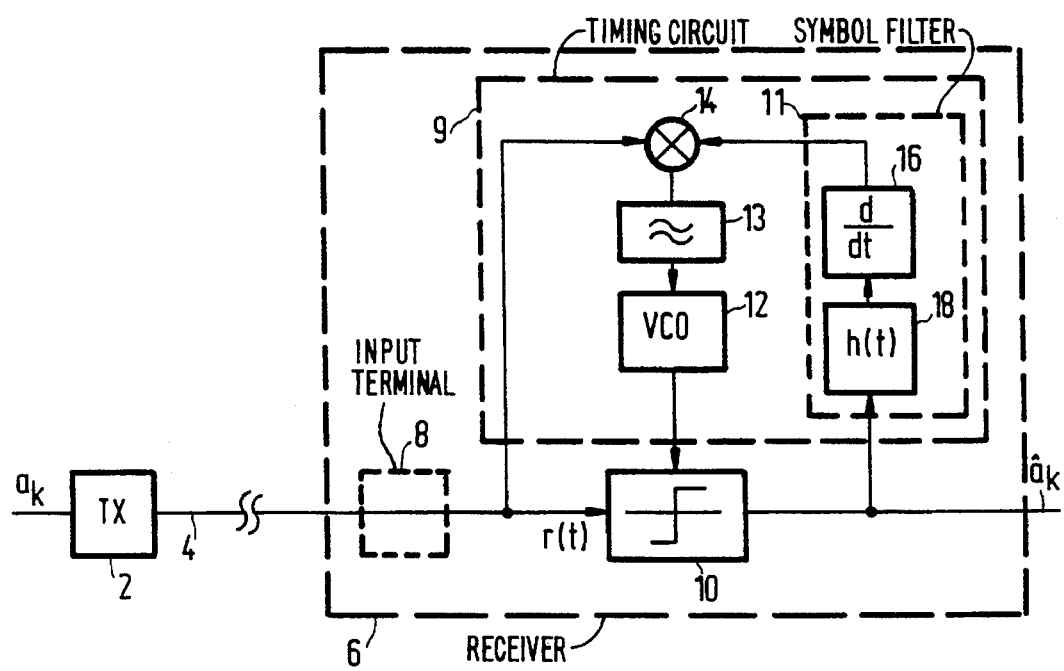
FIG. 1 shows a transmission system comprising a receiver with continuous-time timing means according to the invention.

In the transmission system shown in FIG. 1 the transmit symbols $a_k$ are applied to the input of a transmitter 2. The output of the transmitter 2 is coupled to the input of a channel 4. The output of the channel 4 is coupled to an input of a receiver 6. The input of the receiver 6 is coupled to an input of a detector 10 and to an input of timing means 9 by means of input terminals 8. The output of the detector 10 is connected to a second input of the timing means 9 and to the output of the receiver 6. An output of the timing means 9 is connected to a timing input of the detector 10.

The first input of the timing means is connected to a first input of the correlation means, in this case formed by a multiplier 14. The signal on the first input of the multiplier 14 is the second auxiliary signal. The second input of the timing means is connected to an input of a symbol filter 11, in this case formed by a cascade connection of a differentiator 16 and a filter 18. The latter filter has an impulse response that is an estimate of the channel impulse response. The first auxiliary signal is present at the output of the symbol filter 11. This first auxiliary signal is applied to a second input of the multiplier 14.

The output of the multiplier 14 is connected, via a loop filter 13, to the control input of a voltage-controlled oscillator 12 whose output forms the output of the timing means.

The transmitter 2 linearly converts the transmit symbols $a_k$ into pulses suitable for transmission by the channel 4. It is possible for the symbols $a_k$ to come directly from a source, but, alternatively, it is conceivable for the symbols $a_k$ to be already decoded symbols as occurs in many transmission systems. The input means 8 of the receiver 6 determines from its input signal the detection signal to be applied to the input of the detector 10. This input means may comprise, for example, an equalizer, an echo canceller, a fixed input filter or, in simple systems, an interconnection.

The detector determines from the detection signal the series of decisions $â_k$ that is most likely relative to the symbols carried by the detection signal. For example, the detector 10 may be a simple comparator, but alternatively it is possible for the detector to be an MSLE detector such as, for example, a Viterbi detector.

The multiplier 14 determines the product of the first auxiliary signal and the second auxiliary signal. The cross-correlation of first and second auxiliary signals is determined by the combination of multiplier 14 and voltage-controlled oscillator 12. The reason for this is that a correlation can be approximated by a mean value of a product of the signals to be correlated. The mean value is developed in that the voltage-controlled oscillator can be considered a cascade connection of an integrator and a controllable phase shifter for an adjustment of the detection instants.

It is observed that the decisions $\hat{a}_k$ need not always relate to the symbols $a_k$. For example, it is possible for the channel to form such a linear combination of the transmitted symbols $a_k$ that if it were new symbols $b_k$ are present at on the input of the receiver. This is found, for example, in so-called Partial Response systems in which the channel converts binary symbols $a_k$ into ternary symbols $b_k$ which may have a value equal to $a_k - a_{k-1}$. In this case it is often simple to form the timing means on the basis of the symbols $b_k$. The control signal of the VCO may then be obtained by multiplying the ternary detector output signal differentiated with respect to time by the input signal of this detector. Needless to observe that it is alternatively possible to insert a loop filter between the output of the multiplier and the control input of the VCO.

Figure 2:
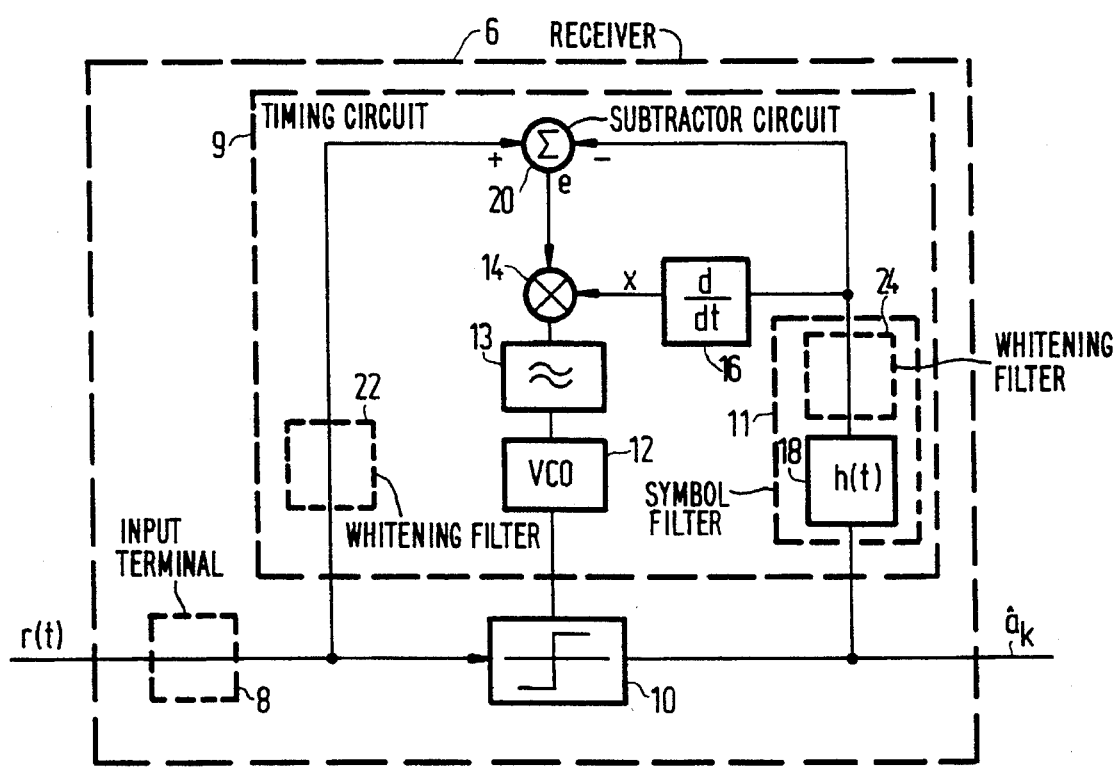
FIG. 2 shows an embodiment of a receiver with continuous-time timing means according to the invention.

The receiver as shown in FIG. 2 is derived from the receiver shown in FIG. 1 in that the second auxiliary signal is determined by a subtracter circuit 20 from the difference between a signal (the detection signal in this case) derived from the receiver input signal and an estimate of this detection signal derived from the symbols already detected by the symbol filter 18. Hereinafter it will be shown that the timing means as shown in FIG. 2 produce a timing error which has the mean square of this timing error for its minimum value.

For the detection signal r(t) there may be written:

$$r(t) = x(t-\tau) + n(t) = \sum_{k=-\infty}^{+\infty} a_k \cdot h(t - kT - \tau) + n(t) \quad (3)$$

where $\tau$ is the delay of the channel, h(t) the impulse response of the channel and n(t) is a noise component present in the detection signal. An estimate of the detection signal calculable by the receiver is $r'(t) = x(t-\theta)$, where $\theta$ is a delay to be determined by the timing means. It is then assumed that the impulse response of the channel is known in the receiver and that all the decisions about the symbols $\hat{a}_k$ are correct. Alternatively, it is possible to utilize a training sequence of symbols known in the receiver, so that in the acquisition phase of the timing means no decisions need to be made about received symbol values. For the output signal e(t) of the subtracter circuit 20 then holds:

$$e(t) = r(t) - x(t-\theta) = x(t-\tau) - x(t-\theta) + n(t) \quad (4)$$

The error signal e(t) will have a minimum power equal to the power of n(t) if $\theta$ is equal to $\tau$. If $\theta$ is unequal to $\tau$, e(t) will also comprise a data component, so that the power of e(t) will generally increase. A possible control criterion is then produced by minimizing the function:

$$\Lambda(\theta) = \int_{-\infty}^{+\infty} e^2(t) dt \quad (5)$$

The minimum of $\Lambda(\theta)$ is found by differentiating (5) to $\theta$. The following will then be found:

$$\Lambda'(\theta) = 2 \int_{-\infty}^{+\infty} e(t) \frac{\partial e(t)}{\partial \theta} dt \quad (6)$$

Using (4) in (6) results in:

$$\Lambda'(\theta) = 2 \int_{-\infty}^{+\infty} e(t) x'(t-\theta) dt \quad (7)$$

(7) corresponds to (2) with the substitution of e(t) for the term r(t). This substitution is implemented in the timing means shown in FIG. 2 by the addition of the subtracter circuit 20 to determine e(t). As the term of e(t) in locked timing means is usually smaller than the term of r(t), the signal on the control input of the voltage-controlled oscillator will be less dependent on the actual value of the transmitted symbols, which causes the detection instants to have less jitter determined by the transmitted symbols. The error signal e(t) can also be used as an error signal to adjust an adaptive equalizer which may be included in the input means.

In the case where the noise component at the output of the input means is not white noise, the output signal of the subtracter circuit 20 includes a noise component which will not be white either. To obtain an error signal e(t) which includes a white noise component, a whitening filter 22 may be inserted into the auxiliary means. As the second auxiliary signal changes because the whitening filter 22 is inserted, it is necessary for the first auxiliary signal to be changed accordingly. For this purpose, the transfer function of the symbol filter 11 is adapted by arranging a corresponding whitening filter 24 in a cascade connection with the original symbol filter 18.

The function of the whitening filter may also be realised by removing the whitening filter 22 and including in the symbol filter 11 an additional filter which has an impulse response that is time inverted to the impulse response of the desired whitening filter. The correctness of said allegation will be shown below. Needless to observe that the whitening filter 24 can be replaced by two filters equal to the whitening filter, one of which is to be inserted just before the differentiator 16 and one of which is to be inserted just after the subtracter circuit 20. The whitening filter 22 and the whitening filter just before the subtracter circuit 20 can be replaced by a whitening filter just after the subtracter circuit. If the output signal of the subtracter circuit 20 is called e(t), the following may be written for the input signal $\hat{e}(t)$ of the multiplier 14 in the above situation:

$$\hat{e}(t) = \int_{-\infty}^{+\infty} w(t-\tau) e(\tau) d\tau \quad (8)$$

where w is the impulse response of the whitening filter. As the VCO may be considered an integrator, there may be written for the adjustment $\Delta_r$ of the detection instants:

$$\Delta_r = \int_{-\infty}^{+\infty} \hat{e}(\theta) x'(\theta) d\theta = \int_{-\infty}^{+\infty} \int_{-\infty}^{+\infty} w(\theta - \tau) e(\tau) x'(\theta) d\tau d\theta \quad (9)$$

If in (9) $w(\theta-\tau)$ is replaced by $w_-(\tau-\theta)$ where $w_-$ is the inverse-time version of w, (9) changes into:

$$\Delta_r = \int_{-\infty}^{+\infty} \int_{-\infty}^{+\infty} w_-(\tau-\theta) e(\tau) x'(\theta) d\tau d\theta = \quad (10)$$

$$\int_{-\infty}^{+\infty} e(\tau) (x' * w_-)(\tau) d\tau$$

where * is the convolution operator. From (10) it is clear that the whitening filter at the error signal input of the multiplier can be replaced by a filter having an inverse-time impulse response of the whitening filter arranged in a cascade connection with the differentiator 16. It may be necessary in this case to delay the impulse response of the filter by the inverse-time impulse response over a certain period of time to obtain a causal impulse response. A corresponding delay is then also necessary for the second auxiliary signal.

It should be observed that it is possible for the jitter caused by noise and/or data in the system to change as regards nature and size. However, in narrow-band timing means these changes will rather have no effect on the performance of the timing means.

Figure 3:
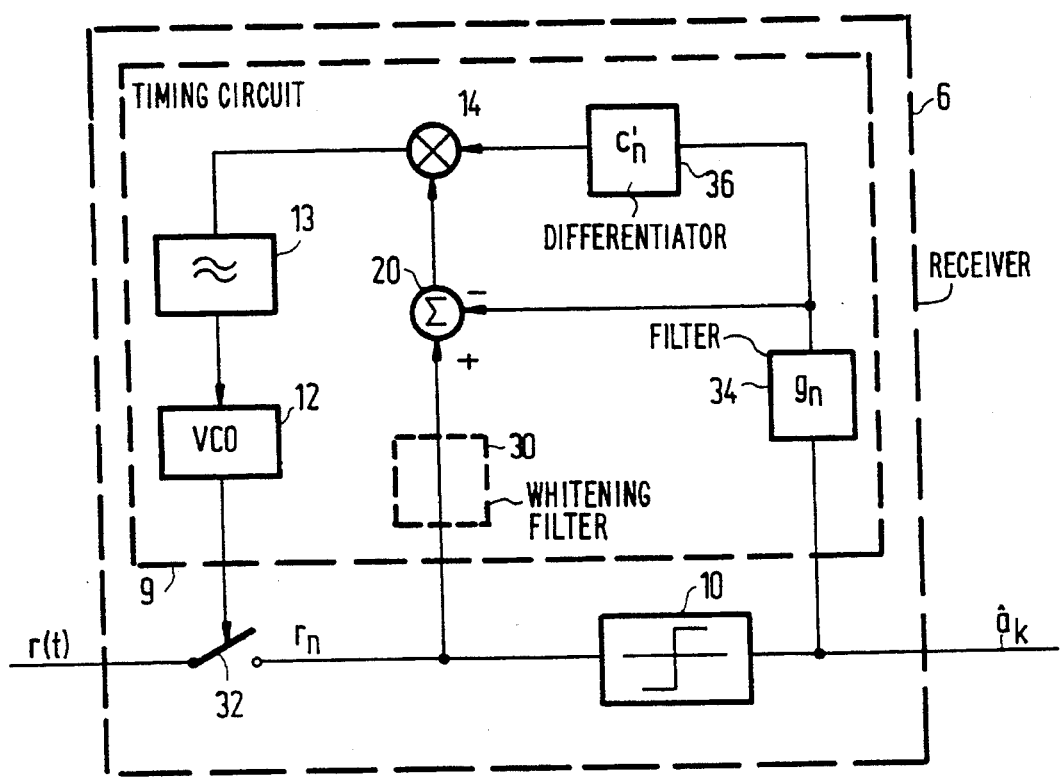
FIG. 3 shows an embodiment of a receiver with discrete-time timing means according to the invention.

In the receiver 6 shown in FIG. 3 the signal $r_t$ is applied to the input of a sampling circuit 32. The output of the sampling circuit is connected to a first input of the timing means 9 and to an input of a detector 10. The output of the detector 10 is connected to the output of the receiver 6 and to a second input of the timing means 9. The first input of the timing means 9 is connected to a first input of a subtracter circuit 20 via the auxiliary means which comprise in this case an interconnection or a whitening filter 30. The second input of the timing means 9 is connected to a second input of the subtracter circuit via a filter 34. In addition, the second input of the timing means 9 is connected to a first input of a multiplier circuit 14 via a symbol filter comprising a cascade connection of the filter 34 and an approximation of a differentiator 36. An output of the filter 34 is connected to a second input of the subtracter circuit 20. The output of the subtracter circuit 20 is connected to a second input of the multiplier circuit 14. The output of the multiplier circuit 14 is connected to a control input of a voltage-controlled oscillator 12 via a low-pass filter 13, whereas an output of the voltage-controlled oscillator 12 is connected to a clock input of the sampling circuit 32.

The receiver 6 as shown in FIG. 3 is the discrete-time equivalent to the continuous-time receiver shown in FIG. 2. The sampling circuit 32 takes samples $r_n$ of the input signal at a rate equal to or a multiple of the reciprocal value of the symbol interval. The timing means 9 provide that the samples of the input signal of the sampling circuit 32 are taken at such an instant that detection of the symbols $â_k$ carried by the samples is possible with a minimum symbol error rate. This means that the sampling instants coincide with the optimum detection instants in the case of the continuous-time receiver shown in FIG. 2. In the receiver shown in FIG. 3 the symbol filter is arranged as a cascade connection of a filter 34 and a differentiator 36. Arranging the symbol filter in this manner is advantageous in that for an adaptive receiver, in which the impulse response of the filter 34 is adapted to the channel impulse response, only the impulse response of the filter 34 needs to be adapted, whereas the impulse response of the differentiator 36 may remain unchanged. If the whitening filter 30 is present, the symbol filter 34 is to be adapted accordingly.

Figure 4A:
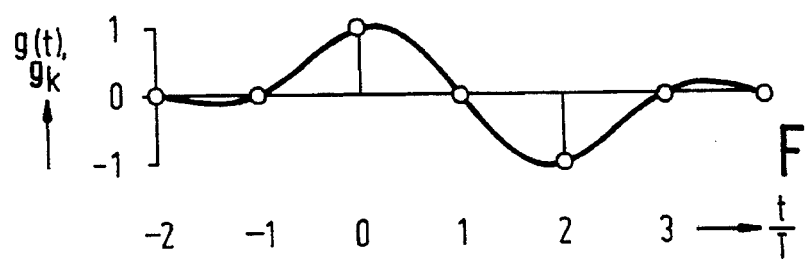
FIGS. 4a and 4b show a first example of an impulse response of a channel shown in FIG. 1 and a derivative with respect to time of this impulse response.
Figure 4B:
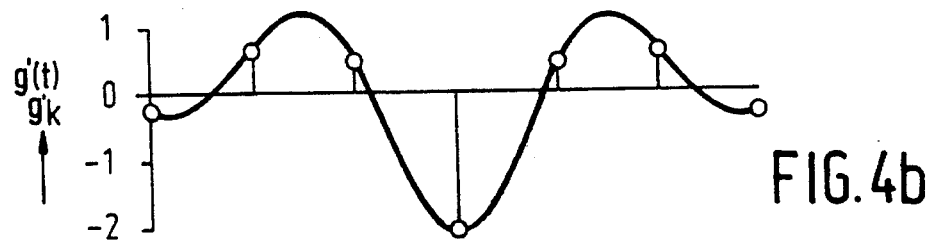

In FIG. 4a the impulse response of a so-termed Partial Response Class IV channel is shown, whose transfer function H(D) is equal to $1-D^2$, where D is the notation customary in data transmission for a delay by one symbol interval. FIG. 4a shows that the sampled version of this impulse response at three consecutive sampling instants is equal to +1, 0 and −1. FIG. 4b shows the derivative of the signal shown in FIG. 4a. From FIG. 4b it may be derived that the derivative of the impulse response can be approximated by an impulse response having values at five successive sampling instants of +1, 0, −2, 0 and +1.

In the receiver shown in FIG. 3 the desired impulse responses may be obtained by equalizing the transfer function G(D) of filter 34 to $1-D^2$ and also equalizing the transfer function C(D) to $1-D^2$.

Figure 5A:
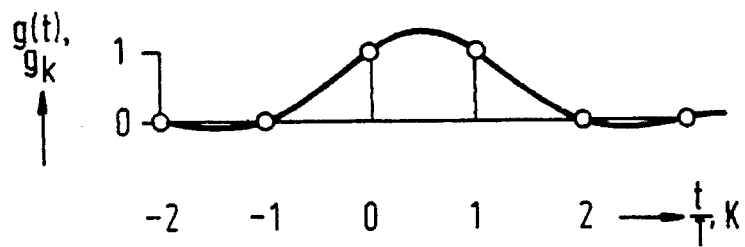
FIGS. 5a and 5b show a second example of an impulse response of a channel shown in FIG. 1 and the derivative with respect to time of this impulse response.
Figure 5B:
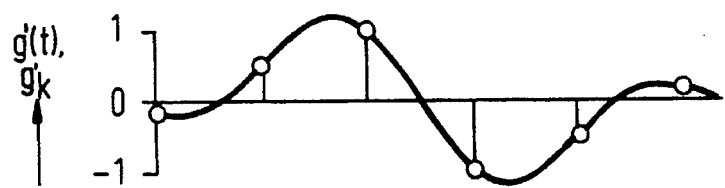

FIG. 5a shows the impulse response of a so-termed duobinary channel whose transfer function H(D) is equal to 1+D. From FIG. 5a it is obvious that the sampled version of this impulse response is equal to +1 and +1 at two successive sampling instants. FIG. 5b shows the derivative of the signal shown in FIG. 5a. From FIG. 5b there may be inferred that the derivative of the impulse response can be approximated by an impulse response having values of +1, +1, −1 and −1 at four successive sampling instants.

In the receiver shown in FIG. 3 the desired impulse responses may be obtained by equalizing the transfer function G(D) of the filter 34 to 1+D and equalizing the transfer function C(D) to $1-D^2$.

The transfer of the differentiator 36 may be approximated by the function $1-D^2$ irrespective of the transfer function of the filter 34. Another possible approximation of a differentiator is the function $-\frac{1}{2}+D-D^3+1/2 \cdot D^4$.

Figure 6A:
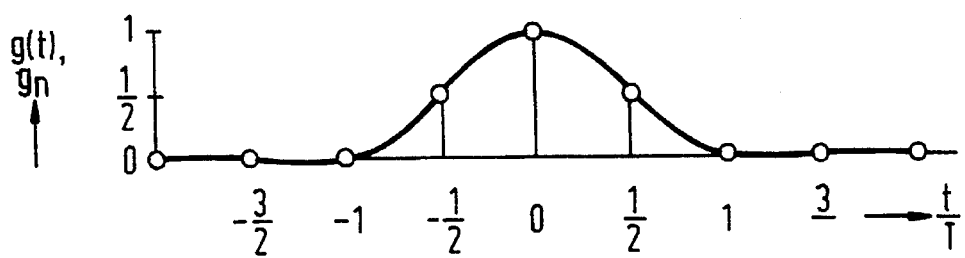
FIGS. 6a and 6b show a third example of an impulse response of a channel shown in FIG. 1 and the derivative with respect to time of this impulse response.

FIG. 6a shows the impulse response of a so-termed raised cosine signal having β=1. As this signal has a non-zero frequency spectrum up to the symbol rate 1/T, it is necessary to sample the detection signal at least twice per symbol interval. The detection signal is detected, however, only once per symbol interval. This oversampling enables the timing means to determine an error signal twice per symbol interval from the first auxiliary signal and the second auxiliary signal. For this purpose, however, it is necessary for the symbol filter to be an interpolating filter having an interpolation factor of 2.

FIG. 6a shows that the sampled version of this impulse response is +½, 1 and +½ at three successive sampling instants. However, only the value of +1 is used for detection purposes.

Figure 6B:
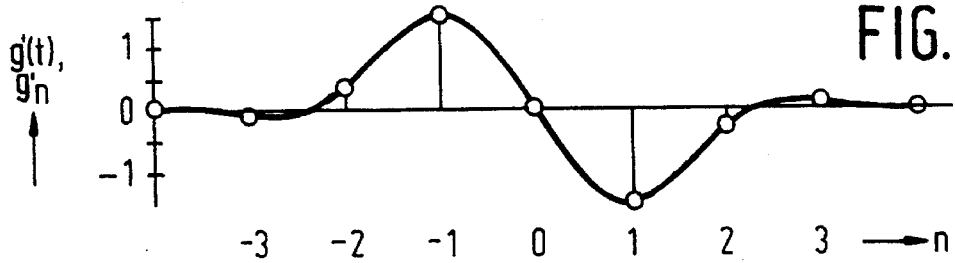

FIG. 6b shows the derivative of the signal shown in FIG. 6a. From FIG. 6b it may be inferred that the derivative of the impulse response can be approximated by an impulse response having values of +1, +1 and −1 at three successive sampling instants.

In the receiver shown in FIG. 3 the desired impulse responses can be obtained by equalizing the transfer function G(d) of the filter 34 to $½+d+½d^2$, where d is a delay extending over half a symbol interval, and equalizing the transfer function C(d) to $1-d^2$.

The transfer function of the differentiator 36 may be approximated by the function $1-d^2$ irrespective of the transfer function of the filter 34. Another possible approximation of a differentiator is the function $-\frac{1}{2}+d-d^3+1/2 \cdot d^4$.

What is claimed is:

1. A digital transmission system for transferring an input signal including symbols via a channel, comprising:

a receiver including a detector for determining detected symbols at predetermined detection instants from a detection signal derived from the input signal;

timing means including a symbol filter for receiving the detected symbols and outputting a filtered signal, said symbol filter having an impulse response dependent on an impulse response of the channel, said timing means also receiving the detection signal and thereby determining a timing error signal by correlating the filtered signal and the detection signal and for adapting the detection instants in response to the timing error signal; and a transmitter coupled to the receiver via the channel.

2. The transmission system of claim 1, wherein the impulse response of the symbol filter approximates the first derivative with respect to time of the impulse response of the channel from an output of the transmitter to an input of the detector.

3. The transmission system of claim 1, wherein the timing means further includes a whitening filter which receives the detection signal for transforming a noise component of the detection signal into a substantially white noise component and wherein the symbol filter has a transfer function equal to a product of a transfer function of the whitening filter and a transfer function approximates the first derivative with respect to time of the impulse response of the channel.

4. The transmission system of claim 1, wherein the detection signal includes a noise component and wherein the symbol filter has a transfer function equal to the product of a transfer function which has an amplitude transfer in a certain frequency area proportional to a reciprocal value of the power spectrum of noise component and the transfer function belonging to an impulse response which is an approximate of a first derivative with respect to time of the impulse response of the channel.

5. A digital transmission system for transferring an input signal including symbols via a channel, comprising:
 a receiver including a detector for determining detected symbols at predetermined detection instants from a detection signal derived from the input signal;
 timing means for receiving the detected symbols and the detection signal, said timing means including:
  a symbol filter for receiving the detected symbols and for outputting a filtered signal, said symbol filter having an input response dependent on an impulse response of the channel;
  a subtraction circuit having an output for generating a difference between the detection signal and the filtered signal;
  correlation means for determining a timing error signal by correlating the signal at the output of the subtraction circuit and the detected symbols;
  adapting means for adapting the detection instants in response to the timing error signal; and
 a transmitter coupled to the receiver via the channel.

6. A receiver for receiving an input signal including symbols via a channel, comprising:
 a detector for determining detected symbols at predetermined detection instants from a detection signal derived from the input signal; and
 timing means including a symbol filter for receiving the detected symbols and outputting a filtered signal, said symbol filter having an impulse response dependent on an impulse response of the channel, said timing means also receiving the detection signal and thereby determining a timing error signal by correlating the filtered signal and the detection signal and for adapting the detection instants in response to the timing error signal.

7. The receiver of claim 6, wherein the impulse response of the symbol filter includes an approximation of the first derivative with respect to time of the impulse response of the channel.

8. The receiver of claim 6, wherein the timing means further includes a whitening filter which receives the detection signal for transforming a noise component of the detection signal into a substantially white noise component, and wherein the symbol filter has a transfer function equal to a product of a transfer function of the whitening filter and a transfer function which is an approximation of the first derivative with respect to time of the impulse response of the channel.

9. The receiver of claim 6, wherein the detection signal includes a noise component and wherein the symbol filter has a transfer function equal to the product of a transfer function which has an amplitude transfer in a certain frequency area proportional to a reciprocal value of the power spectrum of noise component and the transfer function belonging to an impulse response which is an approximate of a first derivative with respect to time of the impulse response of the channel.

10. A receiver for receiving an input signal including symbols via a channel, comprising:
 a detector for determining detected symbols at predetermined detection instants from a detection signal derived from the input signal, and timing means for receiving the detected symbols and the detection signal, said timing means including:
  a symbol filter for receiving the detected symbols and having an impulse response dependent on an impulse response of the channel thereby to derive an auxiliary signal,
  a subtraction circuit having an output for generating a signal that is the difference between the detection signal and the auxiliary signal;
 correlation means for determining a timing error signal by correlating the signal at the output of the subtraction circuit and the auxiliary signal; and
 means for adapting the detection instants in response to the timing error signal.

* * * * *